March 5, 1935. J. F. HEIDER 1,993,274
CLEAR VISION APPARATUS
Filed Feb. 1, 1934 2 Sheets-Sheet 1
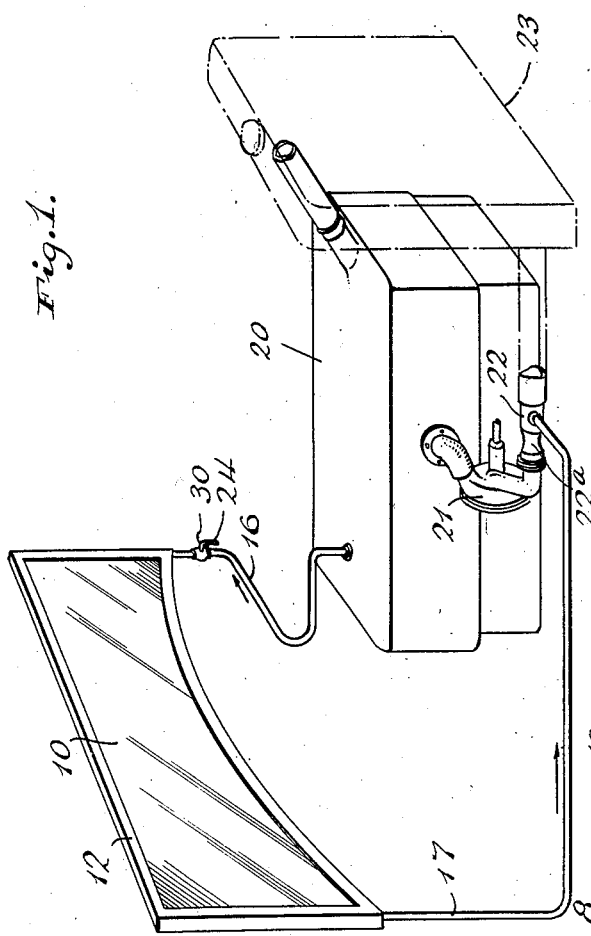
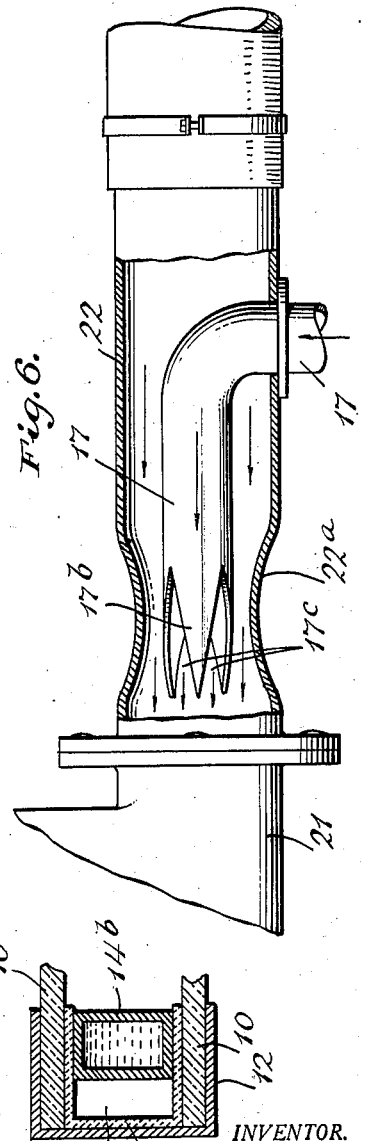
INVENTOR.
JOHN F. HEIDER
BY
ATTORNEYS.

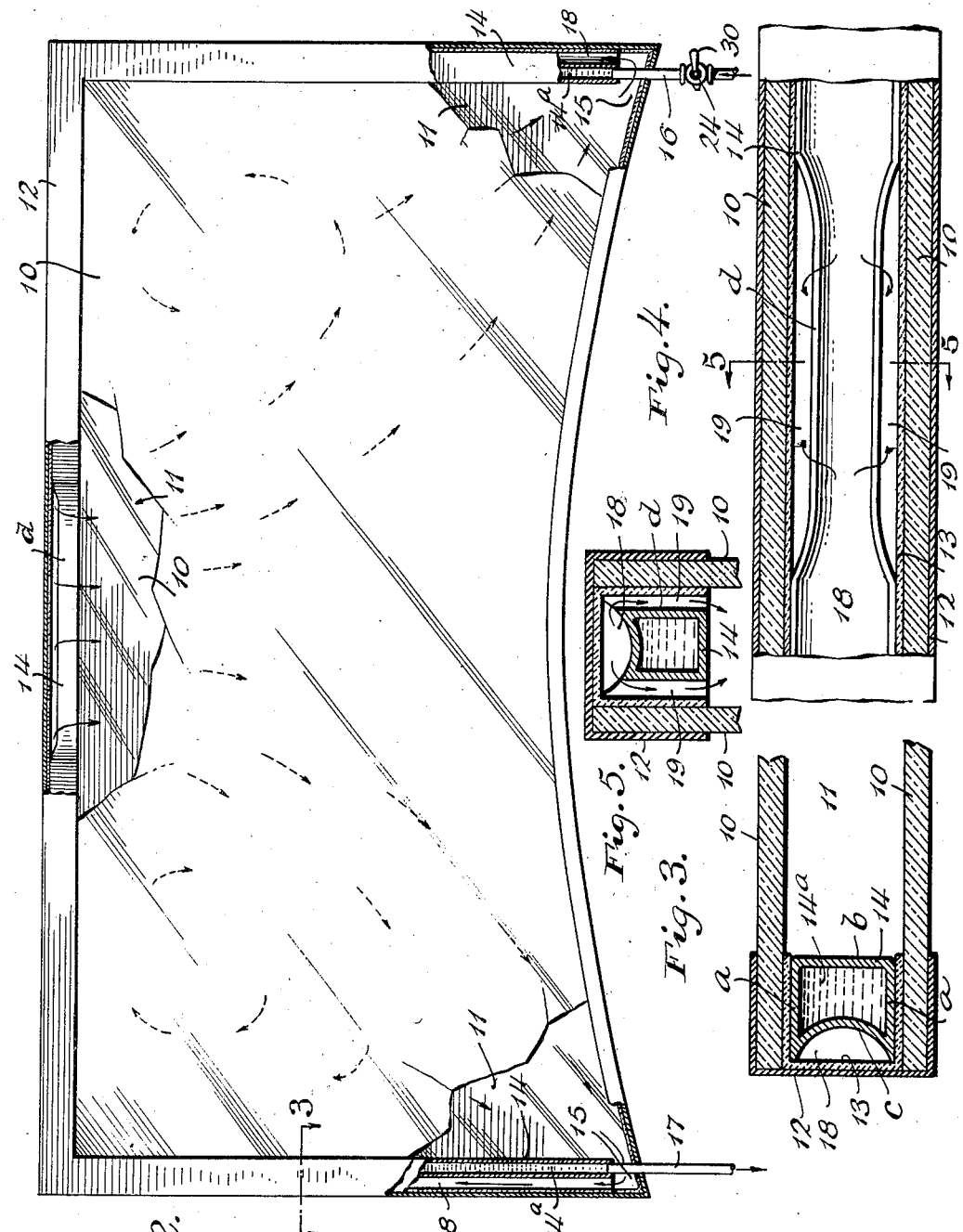

Patented Mar. 5, 1935

1,993,274

UNITED STATES PATENT OFFICE 1,993,274

CLEAR VISION APPARATUS

John F. Heider, Glendale, N. Y.

Application February 1, 1934, Serial No. 709,276

7 Claims. (Cl. 20—40.5)

The invention relates to the windshields of automotive vehicles, and more particularly automobiles, and has for its object to construct the windshields of such vehicles in a novel manner and to provide a novel apparatus in combination therewith whereby said windshields may be heated to prevent the accumulation of frost, vapor and moisture thereon. Other more specific objects will appear from the description hereinafter and the features of novelty will be pointed out in the claims.

In the accompanying drawings, which illustrate an example of the invention without defining its limits, Fig. 1 is a diagrammatic view in perspective showing the novel windshield and associated apparatus; Fig. 2 is a face view of the novel windshield with parts broken away; Fig. 3 is an enlarged detail section on the line 3—3 of Fig. 2; Fig. 4 is a fragmentary top edge view of the windshield, on an enlarged scale and partly in section; Fig. 5 is a fragmentary section on the line 5—5 of Fig. 4; Fig. 6 is an enlarged detail view, partly in section, showing a portion of the apparatus; Fig. 7 is a detail section illustrating a valve included therein, and Fig. 8 is a sectional view similar to Fig. 3 showing another form of the invention.

As shown in the illustrated example, the novel windshield comprises two sheets of glass 10 spaced apart to form an air chamber 11 which may be closed against the entrance of dirt or other foreign matter, and against any material inflow of air in any suitable manner; as shown in the drawings, the closing of the chamber 11 is effected by means of a channeled frame 12 of metal or other suitable material which is fitted over the peripheral edges of the windshield and extends in surface engagement with the outer faces of the sheets of glass 10, as shown in Figs. 3 and 5. The frame 12 or its equivalent, may be fixed in place in any convenient manner as by cementing in the well-known way. In the preferred arrangement a channeled heat insulating packing 13 of asbestos or other heat resistant material is located along the top and opposite sides of the windshield in surface contact with the inner faces of the sheets of glass 10 and with the transverse sections of said packing 13 in surface contact with the channeled frame 12, as illustrated in Figs. 3 and 5. The windshield further includes a conduit for a heating fluid, which conduit extends along the top and two sides of the windshield within the chamber 11, as shown in Fig. 2 of the drawings; in the preferred arrangement the conduit is either constructed or located so as to provide an air channel extending adjacent and parallel to the heating fluid conduit between the latter and the packing 13. In any case the elements 14 forming the aforesaid heating fluid conduit 14ª throughout the major portion of their length are dimensioned to fit into the channeled packing 13 and are provided with parallel straight walls $a$ located in surface engagement with said packing 13, as shown in Fig. 3; the inner walls $b$ of said elements 14 preferably are also straight and extend at right angles to the walls $a$ so as to provide a continuous flat heat-radiating surface facing inwardly toward the chamber 11 along the top and opposite sides thereof. The elements 14 which form the fluid conduit 14ª may be made of metal or any other suitable material, and with the arrangement set forth serve, in addition to their other functions, to fix the sheets of glass 10 in spaced relation, it being understood that any conventional additional means may be provided to maintain this spaced relation if this should be deemed necessary or desirable. It will be understood that the horizontal section of the elements 14 forming the conduit 14ª preferably extends completely across the top of the windshield and that the vertical side members of said elements 14 terminate at a distance above the lower closed edge of the windshield to form openings 15 at the opposite lower corners of the chamber 11 for the purpose to be more fully set forth hereinafter. The terminating ends of the elements 14 which form the conduit 14ª are closed and are provided with inlet and outlet connections in the form of tubes or pipes 16 and 17 respectively, both of which project exteriorly of the air chamber 11 as illustrated in Figs. 1 and 2; to permit the windshield to be adjusted in any conventional manner to open and close the same, the tubes or pipes 16 and 17 may be flexible and arranged in a manner to avoid interference with such adjustment. In order to provide the air channels 18 adjacent and parallel to the conduits 14ª, the elements 14 may be longitudinally recessed along one wall thereof as by curving said wall inwardly as indicated at $c$ in Fig. 3, or as shown in Fig. 8, the elements 14ᵇ, which correspond to the elements 14, may be of rectangular form in cross section and located at a distance from the transverse sections of the packing 13, in which case the spaces between the elements 14ᵇ and the packing 13 constitute the air channels 18. At an intermediate point the horizontal section of the elements 14 is constricted as indicated at $d$ in Figs. 2 and 5 to provide openings 19 which establish communication between the air channel 18 and the air chamber 11 at the upper intermediate part thereof. In the preferred arrangement the hot water which is circulated through the pipe 14ª is obtained from the water circulating system which forms part of and serves to cool the motor included in the automotive vehicle in which the novel apparatus is incorporated. For this purpose the inlet tube or pipe 16 leading from the one end of the conduit 14ª may be connected with the water jacket of the motor 20 at a point within the hot water zone thereof, while the outlet tube or pipe 17 may lead from the other end of the conduit 14ª to the water pump 21 included as a part of the aforesaid water circulating system.

To increase the efficiency of the mechanism, the exit end 17ª of the connection exemplified by the tube or pipe 17 extends interiorly and lengthwise of the inlet pipe 22 whereby the pump 21 is connected with the customary radiator 23 in the conventional manner; the exit end 17ª terminates in a plurality of prongs 17ᵇ so that said exit end is provided with open recesses 17ᶜ as shown in Fig. 6, it being understood that corresponding recesses may be provided in said exit end 17ª in any equivalent manner. To increase the efficiency of the device, the inlet pipe 22 is constricted at a point adjacent to the recesses 17ᶜ as indicated at 22ª. To control the circulation of hot water through the pipe 14ª, a valve casing 24 is inserted at a suitable point in the connection 16 and is provided with openings 25 communicating with said connection and with an air vent 26, communicating with the atmosphere. A valve 27 is rotatably mounted in the casing 24 and is provided with communicating passages 28 and 29 whereby the flow of the hot water may be controlled and whereby the air vent 26 may be brought into communication with the conduit 14ª when said valve 27 is adjusted to the position shown in Fig. 7 to arrest the circulation of the hot water; the valve 27 may be manually operated in any suitable manner as by means of a conventional handle 30 as shown in Fig. 7.

With the arrangement set forth, a conduit 14ª for a heating fluid extends along the top and two sides of the windshield within the heating chamber 11, it being understood that under certain conditions such conduit 14ª alone may be sufficient for the intended purposes. In the preferred construction however the arrangement includes an air channel 18 extending adjacent and parallel to the conduit 14ª and communicating with the air chamber 11 through the passages 15 at the opposite lower corners of said chamber 11, as shown in Fig. 2. To provide the most efficient circulation of air within the chamber 11, the air channel 18 preferably also communicates with the chamber 11 at the upper intermediate part thereof through the openings 19 or their equivalent. Under such conditions, the novel windshield includes two adjacent non-communicating fluid channels 14ª and 18, one of which, that is the channel 18, is open to the air chamber 11 while the other, that is the conduit 14ª, has no communication with said air chamber 11 or with the air channel 18.

In practice, assuming that the valve 27 is adjusted to a position in which the connection 16 is open to the water circulating system of the motor 20, hot water will pass from said circulating system through the connection 16 and, after circulating through the conduit 14ª, will pass therefrom into the return connection 17 and from the exit end 17ª thereof to the inlet pipe 22 of the pump 21 and back to said circulating system. As the water from the conduit 14ª reaches the exit end 17ª of the connection 17, it will pass out of the free end thereof and outwardly through the recesses 17ᶜ into the stream of water flowing through the pipe 22 from the radiator 23 to the pump 21; because of the constricted portion 22ª of the pipe 22 the stream of water flowing through the pipe 22 will be caused to develop an increased suction action in the exit end 17ª which, for convenience, may accordingly be designated as a suction nozzle. As the hot water is thus circulated in the conduit 14ª, the air in the air chamber 11 will gradually become heated and will tend to pass to the passages 15 and through the same into the air channel 18; in this channel this air will pass upwardly along the opposite side edges of the windshield and in horizontal directions toward the center of the windshield at the top thereof. From this point, the air will pass through the openings 19 back into the air chamber 11 and will circulate therein somewhat in the manner roughly and diagrammatically indicated by the arrows in Fig. 2. The entire areas of the opposed inner surfaces of the sheets of glass 10 will accordingly be traversed by this circulating hot air in the chamber 11 and will serve to warm or heat the sheets of glass 10 to a degree sufficient to prevent the formation of frost and ice upon the exterior surface of the outer sheet 10 and the development of moisture or mist upon the inner surface of the inner sheet 10. It will be obvious that as the air flows through the channel 18 it will become increasingly hotter through contact with the elements 14 and in combination with the relatively cooled air initially located in the chamber 11 and particularly at a point adjacent to the openings 19 will quickly develop the aforesaid circulation which is efficiently maintained in the chamber 11 throughout a given period of operation of the apparatus.

When it is desired to discontinue the circulation of the hot water through the conduit 14ª, the valve 27 is adjusted to the position illustrated in Fig. 7 in which the connection 16 is shut off from the water circulating system of the motor 20, and the air vent 26 is brought into communication with the conduit 14ª as indicated in said figure. As a result of this adjustment the action of the suction nozzle 17ª in co-operation with the action of the pump 21 will withdraw the water from the conduit 14ª and will replace the same with air drawn through the air vent 26 and through the connection 16 into the conduit 14ª. All of the water may thus be easily and quickly withdrawn from the conduit 14ª with the result that danger or damage from freezing is entirely obviated. The slight amount of air which is drawn in through the air vent 26 while the valve 27 is in the position shown in Fig. 7 simply passes into the circulating system to the motor 20 and is absorbed thereby without difficulty and without producing any harmful effects. The operating handle 30 or equivalent device whereby the valve 27 is manually operated may be located within easy reach of a chauffeur or other operator of the vehicle so that the circulation of water through the conduit 14ª may be readily and efficiently controlled at will.

The apparatus is extremely simple in construction and may be readily applied to existing automotive vehicles at comparatively little expense and provides the operator of the automotive vehicle with a medium whereby the windshield may be readily maintained in an efficient condition to provide absolutely clear vision therethrough, regardless of the temperature existing at the time. It will be understood that in the drawings the illustration of the apparatus as applied to an automotive vehicle is of a diagrammatic nature and that such illustration is not to be construed as arbitrarily disclosing the details of the novel arrangement. The latter may be readily adapted to existing types of automotive motors and in some instances the hot water circulating through the conduit 14ᵃ may be replaced by some other heating fluid provided from another available source to effect the same or equivalent results.

To improve the exterior appearance of the windshield, the channeled frame 12 is dimensioned to project over the outer surface of the sheets of glass 10 sufficiently to obscure the elements 14 and the air channel 18 as well as the packing 13 from view. The heat resistant packing 13 serves to prevent the heat in the hot air channel 18 from being radiated outwardly through the frame 12, and also to protect the sheets of glass 10 from being harmfully affected by the heat.

Various changes in the specific forms shown and described may be made within the scope of the claims without departing from the spirit of the invention.

I claim:

1. In an automotive vehicle including a motor provided with a water jacket and a pump for circulating water therethrough, the combination of a windshield consisting of two sheets of glass spaced apart to form an air chamber, a water conduit fitted between said sheets of glass and extending along the upper edge of said air chamber and downwardly along the opposite side edges thereof, said conduit being longitudinally recessed to form an air channel communicating with said air chamber, a heat insulating packing between said conduit and sheets of glass and forming a wall of said air channel, a channeled frame fitted over the peripheral edges of said sheets of glass and the outer surfaces thereof in registry with said conduit to obscure the same from view, an inlet connection from the hot water zone of said water jacket to one end of said conduit, a valve in said connection adapted to control the flow of water therethrough and to admit air thereto when said flow of water is cut off, and a return connection leading from the other end of said conduit and extending interiorly of the inlet pipe of the pump, the exit end of said connection being directed toward said pump and provided with open recesses, and said inlet pipe being constricted at a point adjacent to said recesses.

2. In an automotive vehicle including a motor provided with a water circulating cooling system, the combination of a windshield consisting of two sheets of glass spaced apart to form an air chamber, a channeled frame fitted over the peripheral edges and outer surfaces of said sheets of glass to close said air chamber, a channeled heat insulating packing located along the top and opposite sides of said windshield in surface engagement with the inner faces of said sheets of glass and having its transverse sections in surface contact with said channeled frame, a water conduit fitted within said channeled packing and extending along the top and opposite sides of said windshield between said sheets of glass, said conduit having portions spaced from the transverse sections of said heat insulating packing to form an air channel communicating with said air chamber, and connections from the opposite ends of said water conduit to the water circulating system of said motor.

3. In an automotive vehicle including a motor provided with a water circulating cooling system, the combination of a windshield consisting of two sheets of glass spaced apart to form an air chamber, means for sealing said air chamber, means extending along the top and opposite sides of said windshield between said sheets of glass to form parallel water and air channels, the air channel being in communication with said air chamber and the water channel having no communication therewith, and connections leading from the opposite ends of said water channel to the water circulating system of said motor.

4. In an automotive vehicle, the combination of a windshield consisting of two sheets of glass spaced apart to form an air chamber, means for closing said chamber, and means for circulating a heating fluid in a confined stream exclusively along the top and two sides of said windshield interiorly of said air chamber and for defining an air channel open to said air chamber to concurrently develop a flow of air from said air chamber in adjacent parallel separated relation to said heating fluid and back to said air chamber to thereby circulate the air in said air chamber.

5. A windshield for automotive vehicles consisting of two sheets of glass spaced apart to form an air chamber, a channeled frame fitted over the peripheral edges and outer surfaces of said sheets of glass to close said chamber, a channeled heat insulating packing located along the top and opposite sides of said windshield in surface engagement with the inner faces of said sheets of glass and having its transverse sections in surface contact with said channeled frame, a water conduit fitted within said channeled packing and extending along the top and opposite sides of said windshield, said conduit being longitudinally recessed to form an air channel communicating at its opposite ends with opposite lower portions of said air chamber and being constricted at an intermediate point to provide communication between said air channel and air chamber at the upper portion of the latter, and inlet and outlet connections leading from opposite ends of said water conduit to the exterior of said air chamber.

6. A windshield for automotive vehicles consisting of two sheets of glass spaced apart to form an air chamber, means whereby said chamber is closed along the peripheral edges of said windshield, means extending exclusively along the top and opposite sides of said chamber between said sheets of glass to form adjacent non-communicating fluid channels, one of said channels being open to said air chamber and the other having no communication therewith and connections leading from opposite ends of said other channel to the exterior of said air chamber.

7. A windshield for automotive vehicles consisting of parallel sheets of glass spaced apart to form an air chamber, means whereby said air chamber is closed along the periphery of said windshield, a conduit for a heating fluid located in proximity to said periphery of the windshield within said air chamber and having no communication therewith, said conduit in co-operation with the closed periphery of said windshield forming an air channel adjacent to said conduit and communicating with said air chamber, and inlet and outlet connections leading from said conduit to the exterior of said air chamber.

JOHN F. HEIDER.